Feb. 6, 1973    G. R. BANKS    3,714,725
DEVICE FOR DISPLAYING SHEET MEMBERS HAVING INDICIA THEREON
Filed May 27, 1971
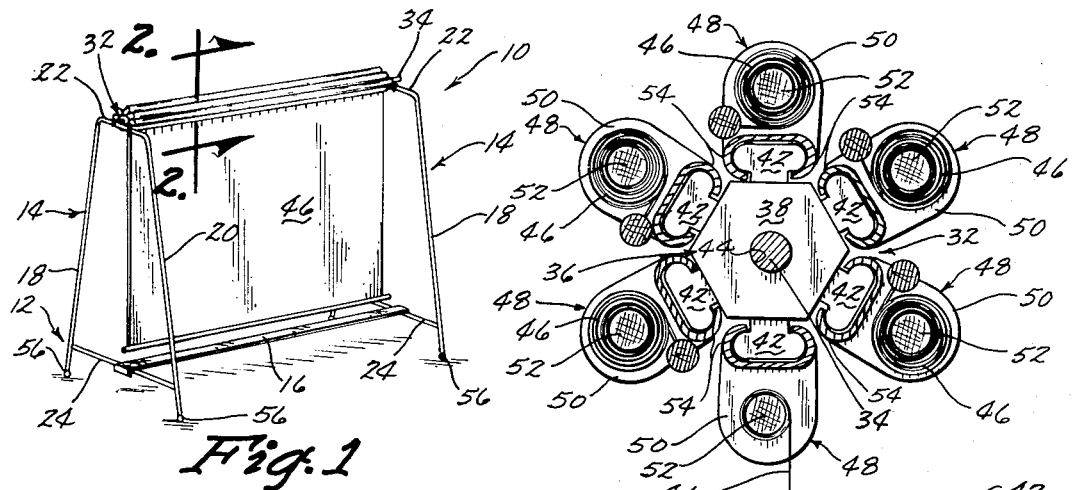
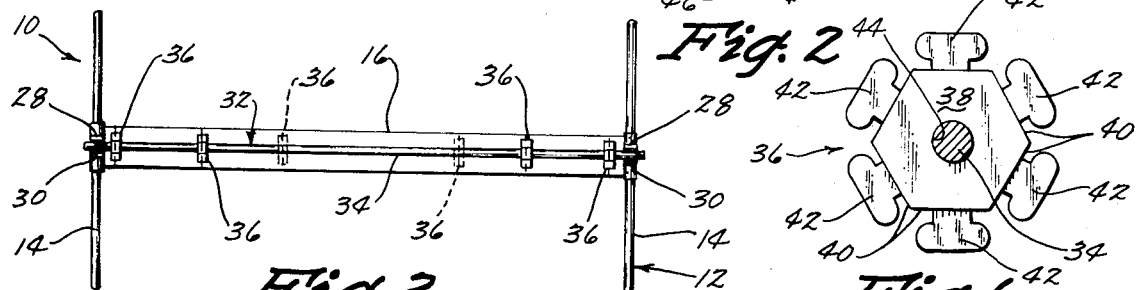
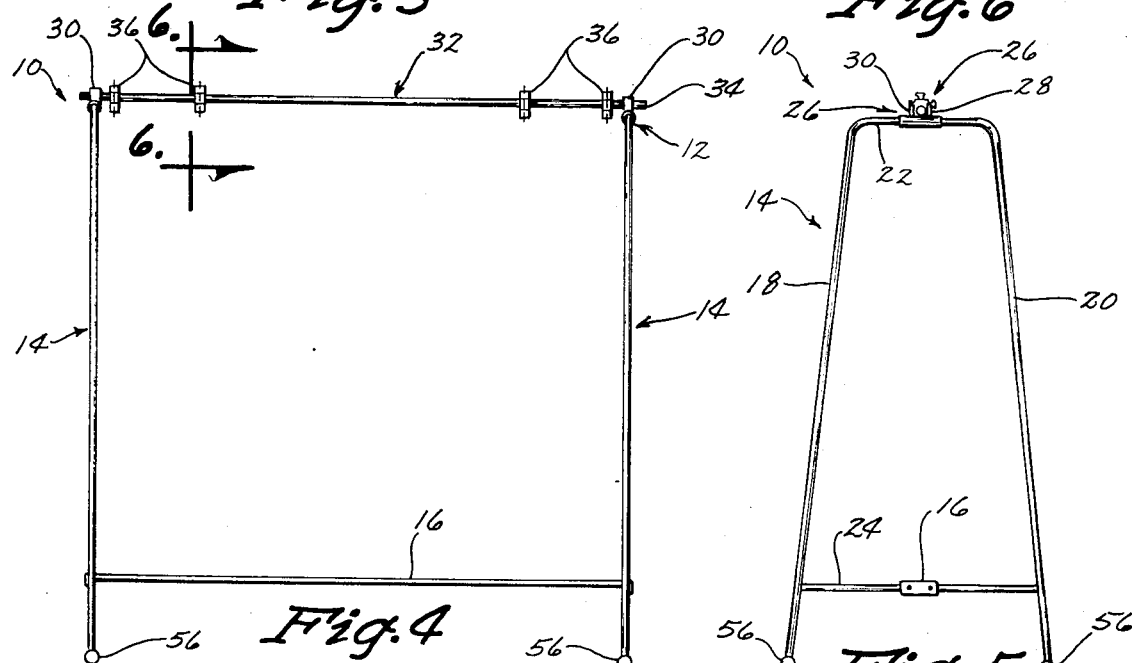
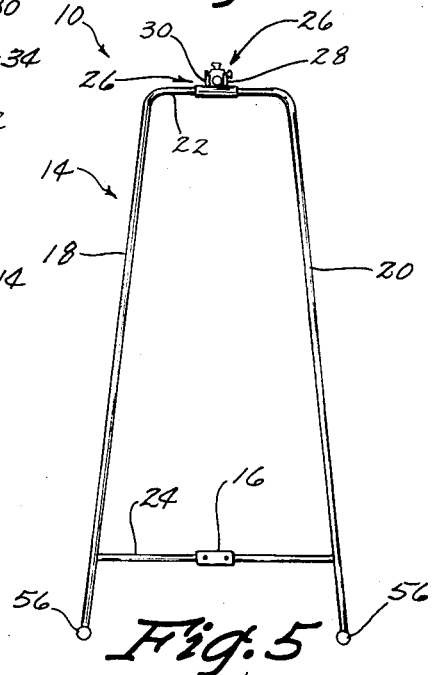
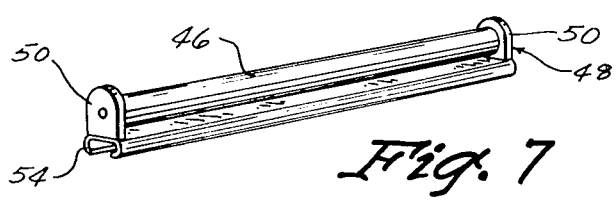
INVENTOR
GARY R. BANKS
BY
Zarley, McKee & Thomte
ATTORNEYS

United States Patent Office 3,714,725
Patented Feb. 6, 1973

3,714,725
DEVICE FOR DISPLAYING SHEET MEMBERS HAVING INDICIA THEREON
Gary R. Banks, Rte. 2, Westfield, Iowa 51062
Filed May 27, 1971, Ser. No. 147,393
Int. Cl. G09f 11/08
U.S. Cl. 40—84    8 Claims

ABSTRACT OF THE DISCLOSURE

A device for displaying sheet members having indicia thereon is comprised of a support frame and an elongated spindle rotatably mounted in the support frame for rotation about a horizontal axis. A plurality of sheet members having indicia thereon are rolled into cylinders and are detachably mounted to the spindle. Complementary brackets are provided on the spindle and on each cylinder for detachably holding the cylinders to the spindle.

---

This invention relates to a device for displaying sheet members having indicia thereon.

Teachers have long used charts and maps as valuable visual aids in the teaching of their classes. Usually these charts or maps are mounted on a rollable shaft which is spring loaded much in the same fashion as conventional window shades. The maps are mounted individually on a wall and the teacher may pull down the individual map wanted in much the same fashion as one would pull down a window shade.

This method of storing and displaying the maps or charts has several disadvantages. If the maps or charts are mounted on the wall only one side of each map may be used by the pupils, and the back side of the map is unusable. Furthermore, if these maps are mounted on a wall they are not easily transportable from one room to another. Also, maps mounted on the wall take up valuable wall space, and cannot be moved out of the way when they are not being used.

The present invention provides a means for storing and displaying maps or other charts wherein both sides of the map or chart may be viewed, and wherein the charts or maps may be moved from room to room or may be moved aside when not in use.

Therefore a principal object of the present invention is the provision of a device for displaying sheet members which can be easily moved from one place to another.

A further object of the present invention is the provision of a device which will permit the display of both sides of the sheet members.

A further object of the present invention is the provision of a device for displaying sheet members wherein a plurality of sheet members are rolled up and stored on the device and are easily accessible for unrolling to display the indicia thereon to a group of people.

A further object of the present invention is the provision of a device which will be adjustable to accommodate rolled up sheet members of varying sizes.

A further object of the present invention is the provision of a device which will not mar the walls or book cases in the classroom.

A further object of the present invention is the provision of a device which may be mounted in classrooms having a multitude of windows.

A further object of the present invention is the provision of a device which is light in weight and easily transportable.

A further object of the present invention is the provision of a device which is attractive in appearance and economical to manufacture.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the present invention.

FIG. 2 is a sectional view taken along line 2—2 of FIG. 1.

FIG. 3 is a top view of the present invention.

FIG. 4 is a front elevational view of the present invention.

FIG. 5 is an end view of the present invention.

FIG. 6 is an enlarged sectional view taken along line 6—6 of FIG. 4.

FIG. 7 is a perspective view of one of the sheet member holding devices.

Referring to the drawings, a device for displaying sheet members having indicia thereon is generally designated by the numeral 10. Device 10 includes a frame 12 having opposite end frames 14 which are interconnected by a cross frame member 16. Each end frame 14 is A-shaped and includes legs 18 and 20 interconnected by a horizontal upper bar 22 and a horizontal cross bar 24. Mounted on each upper bar 22 is a bracket 26 having two upstanding legs 28, 30 which are spaced apart from one another.

Rotatably journaled in at its opposite ends in brackets 26 is a spindle 32. Spindle 32 includes an elongated shaft 34 which has its opposite ends resting between legs 28, 30 of brackets 26. Mounted on shaft 34 in spaced relationship to one another are a plurality of spindle members 36. Referring to FIG. 6, each spindle member 36 includes a wheel 38 having a plurality of outwardly presented surfaces 40. Spindle members 26 also each include a bracket 42 mounted on each surface 40 of wheel 38. Brackets 42 have a T-shaped configuration, the cross of the T being outwardly presented. Wheel 38 includes an aperture 44 through which extends shaft 34. Spindle members 36 are slidable on shaft 34 so as to permit adjustment inwardly and outwardly along the length of shaft 34. Thus spindle 32 collectively includes shaft 34, spindle members 36, wheels 38, and brackets 42.

Referring to FIGS. 1, 2, and 7, a plurality of maps 46 are adapted to be mounted on spindle 32. Each map 46 is rollably mounted on a sheet member holding device 48. Devices 48 are chart or map rails which are conventional in construction, and each one includes a pair of end brackets 50 which rotatably support a spool 52. Spool 52 is spring mounted in a manner similar to the spring mounting of spools conventionally used for window shades. Sheet member 46 is connected at its upper end to spool 52 and is adapted to be wound therearound.

Each holding device 48 is modified for purposes of the present invention by being provided with an elongated channel 54 which is C-shaped in cross section and which interconnects brackets 50 at the opposite ends of each spool 52. Channel 54 is adapted to slidably fit over brackets 42 on spindle 32 as is shown in FIG. 2. Thus, holding device 48 can be slidably mounted on spindle 32 merely by sliding channel 54 over bracket 42. Brackets 42 may either be solid in construction, as shown in the drawings, or they may be formed by strip material which has been bent into a T-shaped configuration similar to that of brackets 42.

Frame 12 is provided with casters 56 at the bottom of its legs to permit the frame 12 to be moved easily.

In operation the particular maps or charts to be used are mounted on holding devices 48 in the manner presently known conventionally in the art. Then holding devices 48 are mounted on spindle 32 by sliding channels 54 over brackets 42. Wheels 38 may be slidably moved inwardly or outwardly along the length of shaft 34 so as to accommodate holding devices 48 which have varying lengths.

Spindle 32 is then rotatably mounted on frame 12 by resting the ends of shaft 34 between legs 28, 30 of bracket 26. The teacher or instructor then pulls down the particular map or chart desired so that it is suspended from holding device 48 as shown in FIG. 1. The students may view one side of sheet member 46, or the frame 12 may be turned around on casters 56 so that the students may view the other side. When the teacher desires to show the students a different map the first one may be retracted in the same fashion that conventional window shades are retracted and the additional map desired to be seen may be pulled down in similar fashion. Thus the particular device shown in the drawings will permit a selection of six sheet members 46 each having indicia on opposite sides thereof. The particular number of sheet members which may be accommodated by the present invention may be varied merely by providing different numbers of brackets 42 on the outer surface of spindle 32.

The present invention may be moved easily from room to room or may be stored in a closet or in an out-of-the-way place when not being used. The sheet members are grouped into one area and may be selected merely by turning spindle 32.

Frame member 12 may be constructed of aluminum tubing to provide a light and easily movable support for spindle 32. Spindle 32 may also be easily mounted on supports other than frame 12 shown in the drawings. For example, spindle 32 could be mounted between arms which are rigidly mounted to a wall and which extend outwardly therefrom. In such a case brackets similar to brackets 26 would be provided on the arms for receiving shaft 34 of spindle 32. Opposite sides of each sheet member 46 could be viewed merely by lifting spindle 32 out of brackets 26 and reversing its position so as to expose both sides of sheet member 46.

Thus the device described above accomplishes at least all of its stated objectives.

I claim:
1. In combination
    a frame;
    an elongated shaft;
    means for rotatably mounting said shaft on said frame for rotation about a horizontal axis;
    a plurality of spindle members on said shaft;
    a plurality of elongated holding devices, each of said holding devices having an elongated spool thereon;
    a plurality of sheet members having indicia thereon; each of said sheet members being rolled into a cylinder around one of said spools;
    said holding devices being positioned so that said cylinders are parallel to said horizontal axis and are positioned around said shaft in spaced relation thereto;
    said spindle members each having a plurality of brackets thereon;
    said holding devices having channel means thereon for detachably retentively engaging said brackets whereby said holding devices may be detachably mounted to said spindle members; and
    means movably mounting each of said spindle members on said shaft for longitudinal movement along the length of said shaft, whereby said spindle members may be moved longitudinally on said shaft to accommodate said holding devices when said holding devices are of varying lengths.

2. A combination according to claim 1 wherein said channel means are elongated and have uniform cross section along their lengths, said channel means being disposed with their longitudinal axes parallel to said shaft.

3. A combination according to claim 1 wherein each of said brackets is shaped to retentively engage one of said channel means and to slide along the length thereof.

4. A combination according to claim 3 wherein said channel means are C-shaped in cross section and said brackets are shaped to matingly slidably fit within said C-shape.

5. A combination according to claim 3 wherein each of holding devices is mounted to at least two of said spindle members, each of said channel means retentively engaging one of said brackets on each of said two spindle members.

6. The combination of claim 1 wherein the opposite ends of said shaft are rotatably mounted in mounting brackets which are on said support frame.

7. The combination of claim 6 wherein said mounting brackets each include an upwardly presented yoke having two spaced apart upwardly extending arms, said shaft resting between said arms.

8. The combination of calim 1 wherein said support frame includes two end frame members which are A-shaped.

References Cited
UNITED STATES PATENTS

| | | | |
|---|---|---|---|
| 745,933 | 12/1903 | Tway | 40—84 |
| 1,576,412 | 3/1926 | Cronk | 40—84 |
| 414,945 | 11/1889 | Henderson | 40—84 |
| 699,293 | 5/1902 | Doldt | 40—84 |
| 886,723 | 5/1908 | Nystrom | 40—84 |
| 1,009,181 | 11/1911 | Ringrose | 40—84 |

ROBERT W. MICHELL, Primary Examiner

J. H. WOLFF, Assistant Examiner